A. S. JACKSON.

BAKING PAN.

No. 9,887. Reissued Oct. 4, 1881.

Witnesses:

G. G. Adamson.

C. E. Adamson.

A. S. Jackson

Inventor.

By C. E. Adamson

Atty.

UNITED STATES PATENT OFFICE.

ALLEN S. JACKSON, OF KOKOMO, INDIANA.

BAKING-PAN.

SPECIFICATION forming part of Reissued Letters Patent No. 9,887, dated October 4, 1881.

Original No. 240,138, dated April 12, 1881. Application for reissue filed July 25, 1881.

*To all whom it may concern:*

Be it known that I, ALLEN S. JACKSON, a citizen of the United States, residing at Kokomo, in the county of Howard and State of Indiana, have invented a new and useful Baking-Pan, of which the following is a specification.

My invention relates to improvements in bake-pans, in which two or more small pans are united to form one large sectional pan of any size desired.

The objects of my improvements are, first, to construct a bake-pan composed of small rectangular pans for separating the loaves, so that the heat can act on all sides of each loaf uniformly; second, to construct a cheap rectangular sectional bake-pan that will bake a large quantity of bread in less time and with less fuel than one large single pan, on account of the heat passing through the inverted-V-shaped spaces or grooves between the sections of the pan; third, to connect small rectangular pans by turning one edge down over the other, or clamping one over the other, so as to avoid the use of rivets, and by stiffening the pans by a wire in the usual way. I attain these objects by the mechanism illustrated in the accompanying drawings, in which—

Figure 1:
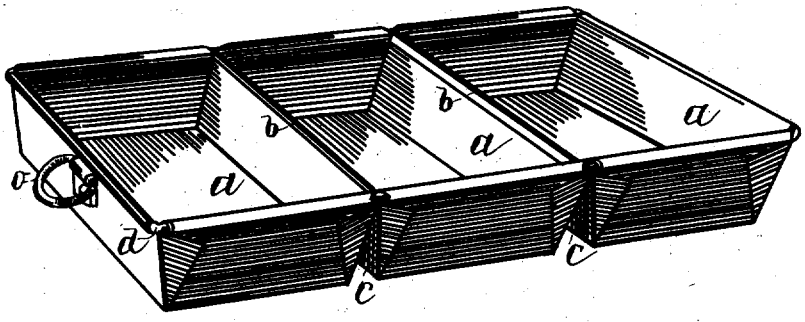
Figure 2:
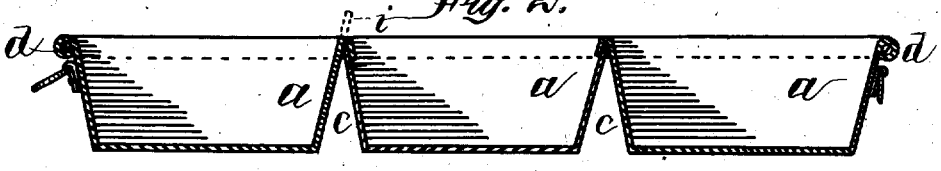

Figure 1 is a perspective view of my pan. Fig. 2 is a longitudinal section of the same.

Similar letters refer to similar parts throughout the several views.

The pans *a* are first cut and formed up single; then, taking two of the pans and putting them (side or ends) together, the edge of one is bent or turned down over the other, as shown at *b* in Fig. 2, so as to form a connection without the use of rivets, by connecting two or more of the pans in this way. A common wire is then placed around the pan (or pans) in the usual way, as shown. The rings *o* are then attached.

As thus described, any number of pans may be connected together. The bottoms of the pans are smaller than the top, and by connecting either or both the sides or ends of the pans, as before described, it leaves an inverted-V-shaped space or groove between them, as shown at *c* in Figs. 1 and 2. The heat will act uniformly through the said spaces *c*, and will bake bread much quicker and better than if baked in one large pan, and when baked it is in separate loaves, and thus avoids the necessity of having to break the loaves apart.

I am aware that small round pans have been connected together by rivets and by a stiffening-wire. Such I do not claim; but What I do claim, and desire to secure by Letters Patent, is—

1. A bake-pan composed of two or more rectangular pans united by the flanged edge of one pan overlapping the unflanged edge of the adjoining pan, the whole inclosed by a stiffening-wire, for the purpose set forth.

2. The combination of two or more bake-pans, united in the manner described, a space or groove, *c*, being formed between the pans, substantially for the purpose set forth.

ALLEN S. JACKSON.

Witnesses:
JOHN W. KERN,
A. H. SOMERS.